United States Patent
Chen et al.

(10) Patent No.: US 8,180,941 B2
(45) Date of Patent: *May 15, 2012

(54) MECHANISMS FOR PRIORITY CONTROL IN RESOURCE ALLOCATION

(75) Inventors: Wen-Tzer T. Chen, Austin, TX (US);
Charles R. Johns, Austin, TX (US);
Ram Raghavan, Round Rock, TX (US);
Andrew H. Wottreng, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/631,407

(22) Filed: Dec. 4, 2009

(65) Prior Publication Data

US 2010/0146512 A1 Jun. 10, 2010

Related U.S. Application Data

(63) Continuation of application No. 11/260,579, filed on Oct. 27, 2005, now Pat. No. 7,631,131.

(51) Int. Cl.
*G06F 13/00* (2006.01)
*G06F 13/368* (2006.01)
*G06F 12/00* (2006.01)
*G06F 13/14* (2006.01)

(52) U.S. Cl. ......... 710/241; 710/111; 710/120; 710/243
(58) Field of Classification Search .................. 710/111, 710/120, 241, 243
See application file for complete search history.

(56) References Cited

U.S. PATENT DOCUMENTS

| | | | |
|---|---|---|---|
| 4,491,946 A | 1/1985 | Kryskow et al. | |
| 4,819,229 A | 4/1989 | Pritty et al. | |
| 4,864,491 A | 9/1989 | Ohuchi | |
| 4,930,121 A | 5/1990 | Shiobara | |
| 5,088,024 A * | 2/1992 | Vernon et al. | 710/111 |
| 5,367,679 A | 11/1994 | Khaira | |
| 5,388,223 A | 2/1995 | Guthrie et al. | |
| 5,434,861 A | 7/1995 | Pritty et al. | |
| 6,073,132 A | 6/2000 | Gehman | |
| 6,157,978 A * | 12/2000 | Ng et al. | 710/240 |
| 6,272,580 B1 * | 8/2001 | Stevens et al. | 710/116 |

(Continued)

OTHER PUBLICATIONS

Image File Wrapper for U.S. Appl. No. 10/738,720; downloaded Mar. 21, 2010, 2 pages.

(Continued)

*Primary Examiner* — Thomas J Cleary
*Assistant Examiner* — Jeremy S Cerullo
(74) *Attorney, Agent, or Firm* — Stephen J. Walder, Jr.; Matthew B. Talpis

(57) ABSTRACT

Mechanisms for priority control in resource allocation is provided. With these mechanisms, when a unit makes a request to a token manager, the unit identifies the priority of its request as well as the resource which it desires to access and the unit's resource access group (RAG). This information is used to set a value of a storage device associated with the resource, priority, and RAG identified in the request. When the token manager generates and grants a token to the RAG, the token is in turn granted to a unit within the RAG based on a priority of the pending requests identified in the storage devices associated with the resource and RAG. Priority pointers are utilized to provide a round-robin fairness scheme between high and low priority requests within the RAG for the resource.

23 Claims, 6 Drawing Sheets

U.S. PATENT DOCUMENTS

| | | | |
|---|---|---|---|
| 6,311,249 B1 * | 10/2001 | Min et al. | 710/111 |
| 6,325,293 B1 | 12/2001 | Moreno | |
| 6,522,628 B1 | 2/2003 | Patel et al. | |
| 6,714,553 B1 | 3/2004 | Poole et al. | |
| 6,907,491 B2 | 6/2005 | Moss | |
| 6,978,329 B1 * | 12/2005 | Harral | 710/116 |
| 6,990,541 B2 * | 1/2006 | Clayton | 710/244 |
| 6,996,647 B2 | 2/2006 | Raghavan et al. | |
| 7,051,135 B2 | 5/2006 | Zhu | |
| 7,127,540 B2 * | 10/2006 | Lee | 710/243 |
| 7,530,068 B2 | 5/2009 | Clark et al. | |
| 7,631,131 B2 * | 12/2009 | Chen et al. | 710/243 |
| 2003/0219028 A1 | 11/2003 | Peyravian et al. | |
| 2005/0138254 A1 | 6/2005 | Raghavan et al. | |
| 2005/0138621 A1 | 6/2005 | Clark et al. | |
| 2007/0101033 A1 | 5/2007 | Chen et al. | |

OTHER PUBLICATIONS

Image File Wrapper for U.S. Appl. No. 10/738,722; downloaded Mar. 21, 2010, 2 pages.

Image File Wrapper for U.S. Appl. No. 11/260,579; downloaded Mar. 21, 2010, 3 pages.

Zhang, et al., "Token ring arbitration circuits for dynamic priority algorithms", (abstract only) Publication date: Aug. 3-5, 1994.

International Search Report and Written Opinion dated Jan. 29, 2007 for International Application No. PCT/EP2006/067660, 10 pages.

* cited by examiner

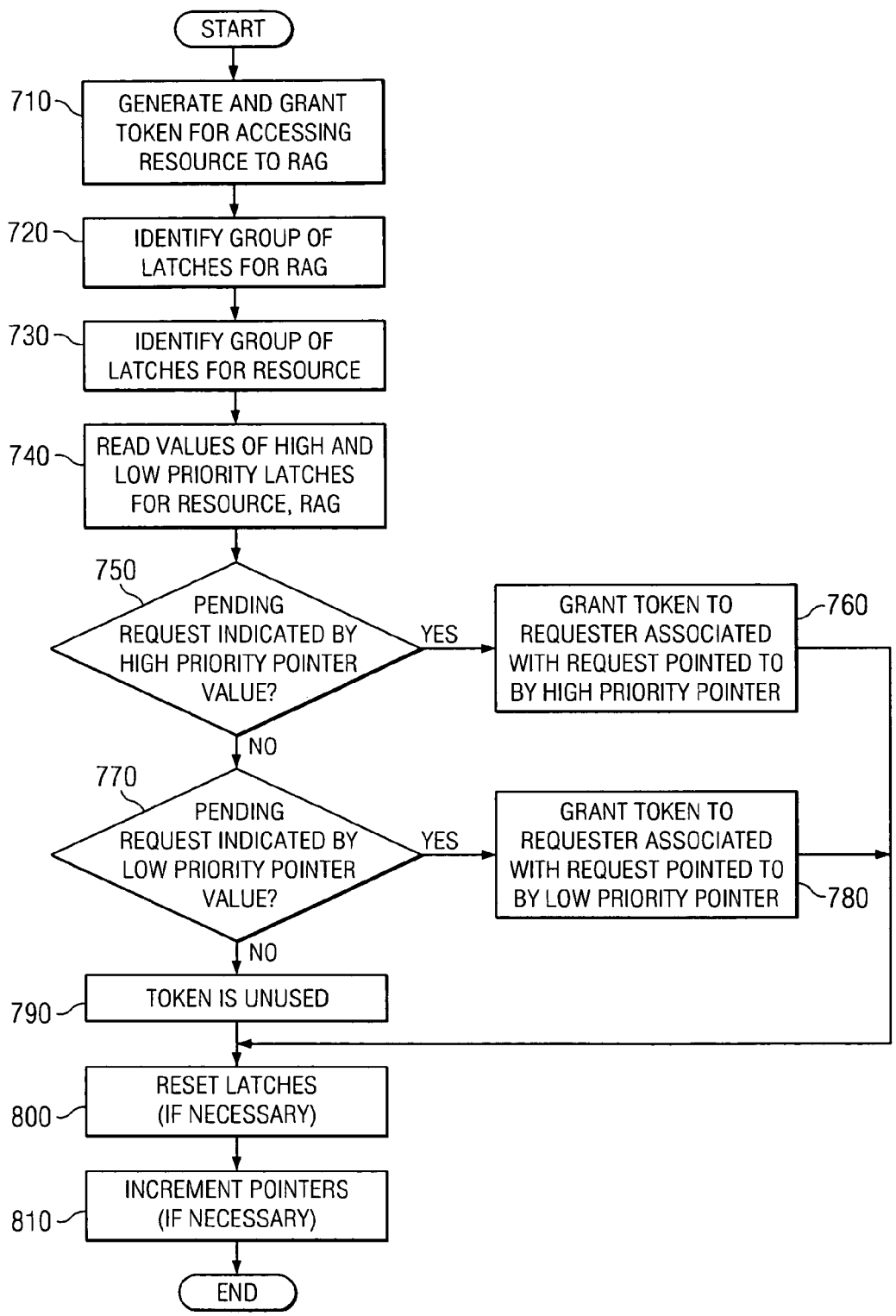

MECHANISMS FOR PRIORITY CONTROL IN RESOURCE ALLOCATION

This application is a continuation of application Ser. No. 11/260,579, filed Oct. 27, 2005, status awaiting publication.

BACKGROUND OF THE INVENTION

1. Technical Field

The present invention relates generally to an improved data processing apparatus and method. More specifically, the present invention is directed to an apparatus and method for providing priority control with regard to resource allocation.

2. Description of Related Art

Bandwidth management techniques have been employed in networking for several years to prevent a small number of users from consuming the full bandwidth of a network, thereby starving other users. The most recent bandwidth management technology handles 10 Gbits per second (1.25 GB/sec), involving 27 million packets per second or less. The techniques employed for managing network bandwidth and priority often require an entire Application Specific Integrated Circuit (ASIC) chip.

Traffic rates inside computer systems are typically higher than network traffic rates. For example, some traffic rates inside computer systems may reach 25 GB per second and may involve 200 million 128 byte packets. Because the bandwidth is managed for multiple resources and this bandwidth is higher than network bandwidths, managing bandwidth inside a computer system is almost an order of magnitude more difficult than network bandwidth management. In addition, the available circuits that can be applied to the management of bandwidth within a computer, such as on a system-on-a-chip, is a small fraction of the circuits on the chip. As a result, the techniques used for network bandwidth management cannot be utilized for management of bandwidth within a computer system. Thus, simpler schemes requiring fewer circuits are needed for managing bandwidth in a computer system.

Often a simple round-robin priority scheme is used to manage bandwidth within a computer system because it promotes fairness between all of the units in the computer system that contend for the bandwidth. Alternatively, a fixed priority scheme may be used for some devices that require low latency. Low latency for some devices is desired due to limited buffering in the device and the negative performance implications of over-running the buffer. Another need for low latency may arise with devices whose performance limits the performance of the entire computer system. To satisfy this need for low latency in some systems, priority is simply assigned to a specific requester, such as an I/O bridge, such that all I/O accesses to the system memory bus have higher priority than any processor attached to the system bus.

In a real-time computer system, a simple round-robin priority scheme is inadequate to produce guaranteed bandwidth results that vary per device and dynamically change. Moreover, using a fixed priority mechanism for some devices, coupled with a round-robin scheme for fairness among other devices, is inadequate for a real-time system with multiple software partitions since it can cause bandwidth starvation of lower priority devices. Granting higher priority to some devices isn't feasible when control of that device belongs to untrusted applications at times, intermixed with periods of time when a trusted operating system or hypervisor controls the device.

SUMMARY OF THE INVENTION

In view of the above, it would be beneficial to have a priority control mechanism in which a guaranteed amount of bandwidth is offered to devices while avoiding bandwidth starvation of lower priority devices. The present invention provides such a mechanism for performing priority control in resource allocation for low request rate, latency-sensitive devices or units.

With the present invention, each unit in the computer system contends for bandwidth by making a request for a memory or input/output (I/O) bus token. This request is sent to a token manager. A token represents the right to use a resource for transfer of up to some defined number of bytes of data, e.g., 128 bytes of data.

When a unit makes a request to the token manager, the unit identifies the priority of its request as well as the resource which it desires to access. The unit also identifies which Resource Access Group (RAG) it belongs to. In some cases a single physical requesting unit may perform accesses on behalf of multiple RAGs, as in the case of an I/O interface controller making requests for multiple I/O busses or I/O devices. In this case, token requests may have different Resource Access Group Identifier (RAG ID) values and a different priority. Therefore, to the token manager, the physical requester may appear to be multiple virtual requesters.

High priority can be assigned based on the type of requester and/or on the type of request that is being requested. For example, a processor performing critical control functions may always have high priority for tokens. In another example, high priority may be assigned to specify types of accesses that are for software locks, for example, in order to minimize the amount of time that a critical lock is held. Moreover, accesses to a page table in memory, when these accesses occur as part of the hardware translation lookaside buffer (TLB) miss handling, may also be assigned high priority in accordance with the present invention.

The token manager tracks all the requests for each resource including the associated RAG and the priority of the requests. In one exemplary embodiment of the present invention, the token manager keeps track of up to 17 virtual requesters and requests for up to 20 resource targets per requester. Internally, the token manager keeps track of requests on a per RAG basis. For each RAG, the token manager records high priority requests for each resource and low priority requests for each resource. For each RAG, the token manager uses tracking latches and rate decrementers to determine how often and exactly when to generate and grant tokens. The token manager records all outstanding requests in tracking latches, using a set of tracking latches for each resource, RAG and priority. The token manager may have round-robin pointers per priority, per resource and per RAG to track which of the multiple requesters in a RAG should be granted a token on a round-robin basis when a token becomes available and there are multiple outstanding requests.

For each set of tracking latches for each RAG and managed resource, there is a round-robin pointer to select the next high or low priority request in the RAG. Round-robin pointers are utilized to give fair treatment between multiple high priority requesters and to give fair treatment between multiple low priority requesters. There are several methods for implementing such a round-robin pointer.

In one scheme, in every cycle, the high priority request round-robin pointer is advanced one "slot", i.e. to the RAG's next high priority request tracking latch for the managed resource. Thus, there are times when the high priority round-robin pointer will point to a "slot" associated with a requester that does not have an active high priority request. At other times, the high priority request round-robin pointer will be advanced to a next "slot" where a high priority request is pending. Likewise, the low priority request round-robin pointer is advanced one slot per cycle until it points to an outstanding low priority request in the RAG. When the round-robin pointers point to a "slot" in which there is a pending request, the round-robin pointer is not advanced until the request is dispatched.

In another scheme, where the number of total potential requests is small, it is feasible to advance a round-robin pointer in a single cycle to directly point to the next outstanding request. In this alternative scheme, if any of the tracking latches for the high priority requests has a pending request, the high priority request will be selected over any low priority requests pending in the low priority tracking latches. It should be kept in mind that this is done on a per RAG basis and that each RAG has a predetermined portion of the available resources allocated to that RAG.

A high priority request is only eligible to be granted a token if the high priority request round-robin pointer points to the request. A low priority request is only eligible to be granted a token if the low priority request round-robin pointer points to the request. However, a high priority request is always selected over a low priority request. When a token becomes available at the rate provided by the RAG's rate decrementer, the token is granted to the associated RAG if a request is outstanding. If a high priority request in the RAG is outstanding, the token is granted to such a request in preference over a low priority request.

In one exemplary embodiment, the present invention provides a method, in a data processing system, for controlling access to a resource. The method may comprise generating and granting a token to a resource allocation group, wherein the resource allocation group comprises one or more operational units within the data processing system. Request information may be obtained from a group of request storage devices associated with the resource allocation group and the resource, wherein the group of request storage devices is separated into a first sub-group of first priority request storage devices and a second sub-group of second priority request storage devices. An operational unit may be selected from the one or more operational units to receive the token based on the request information obtained from the group of request storage devices and the token may be granted to the selected operational unit, wherein the selected operational unit uses the token to access the resource.

The token may be generated and granted to the resource allocation group in response to a counter associated with the resource allocation group reaching a predetermined value. The resource allocation group may be allocated a portion, less than a full amount, of the resource to be shared by the one or more operational units.

The obtaining of request information from a group of request storage devices associated with the resource allocation group and the resource may comprise obtaining a value of a first pointer associated with the first sub-group of first priority request storage devices. In addition, a value of a second pointer associated with a second sub-group of second priority request storage devices may be obtained. A determination may be made as to whether there is a pending first priority request for access to the resource based on the value of the first pointer and a determination may be made as to whether there is a pending second priority request for access to the resource based on the value of the second pointer.

The selecting of an operational unit from the one or more operational units to receive the token based on the request information obtained from the group of request storage devices may comprise selecting an operational unit associated with the first priority request if a pending first priority request is identified by the value of the first pointer. An operational unit associated with the second priority request may be selected if a pending second priority request is identified by the value of the second pointer and the value of the first pointer indicates that a first priority request is not pending. The first sub-group of first priority request storage devices may contain a pending first priority request yet the first pointer may indicate that a first priority request is not pending if the first pointer points to an empty first priority request storage device.

In addition to the above, the method may further comprise incrementing the value of the first pointer to point to a next first priority request storage device in the first sub-group of first priority request storage devices if a request associated with a current value of the first pointer is dispatched. A value of the second pointer may be incremented to point to a next second priority request storage device in the second sub-group of first priority request storage devices if a request associated with a current value of the second pointer is dispatched.

Alternatively, a value of the first pointer may be incremented to point to a next non-empty first priority request storage device in the first sub-group of first priority request storage devices if a request associated with a current value of the first pointer is dispatched. A value of the second pointer may be incremented to point to a next non-empty second priority request storage device in the second sub-group of first priority request storage devices if a request associated with a current value of the second pointer is dispatched.

The data processing system may support a plurality of resource allocation groups and a plurality of managed resources, wherein each resource allocation group has a set of request storage devices, and wherein the set of request storage devices for each resource allocation group is organized into a group of request storage devices for each managed resource, and wherein each group of request storage devices for each managed resource is organized into a first sub-set of request storage devices associated with first priority requests and a second sub-set of request storage devices associated with second priority requests. Each combination of resource allocation group and managed resource may have an associated counter for determining when to allocate a token for accessing the managed resource to the particular resource allocation group.

The resource allocation group may comprise one or more operational units within the data processing system that have a same resource allocation identifier. The data processing system may be a multiprocessor system-on-a-chip having at least two heterogeneous processors.

In addition to the above, the present invention provides a computer program product in a computer readable medium having a computer readable program, wherein the computer readable program, when executed on a computing device, causes the computing device implement the method previously described above. Moreover, the present invention further provides an apparatus comprising an apparatus, comprising a processor, a plurality of operational units coupled to the processor, a resource coupled to the plurality of operational units, a memory coupled to the processor, and a plurality of request storage devices coupled to the processor. The memory may store instruction which, when executed by the processor, cause the processor to implement the method previously described above.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a flowchart outlining an exemplary operation of the present invention when selecting a requester to which a token is to be granted in response to a token being granted to resource allocation group in accordance with one exemplary embodiment of the present invention.

DETAILED DESCRIPTION OF THE PREFERRED EMBODIMENTS

Figure 1:
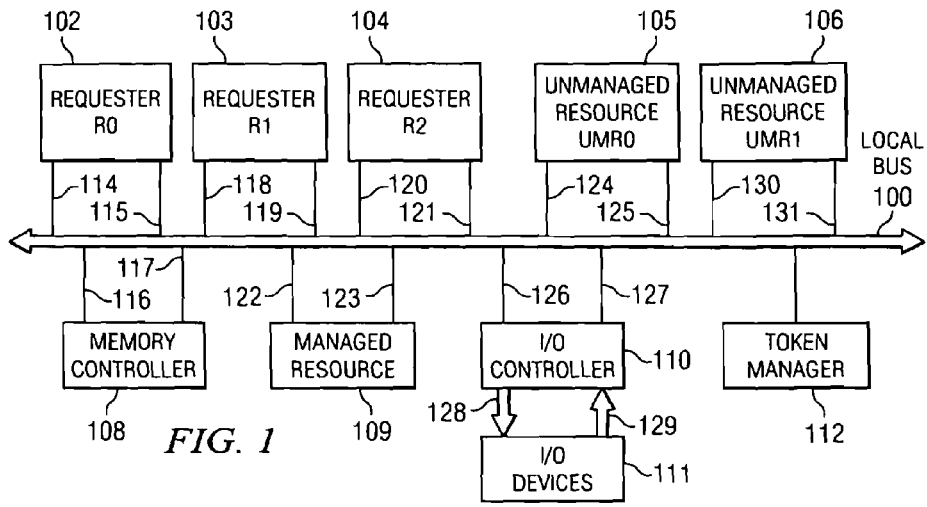
FIG. 1 is an exemplary block diagram of a data processing system in which aspects of the present invention may be implemented.

The present invention provides an apparatus, system, computer program product, and method for providing priority control in association with resource allocation. In an exemplary embodiment of the present invention, the mechanisms of the present invention make use of the architecture described in co-pending and commonly assigned U.S. Patent Publication No. 2005/0138621 A1, entitled "Method of Resource Allocation Using an Access Control Mechanism," filed on Dec. 17, 2003, which is hereby incorporated by reference. The architecture described in this co-pending application is summarized with reference to FIGS. 1-3 below. It should be noted however, that the architecture described hereafter is only one example of the data processing system and environment in which the present invention may be implemented. Other data processing systems and environments may be used with the present invention without departing from the spirit and scope of the present invention, as will become readily apparent to those of ordinary skill in the art in view of the following description.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

FIG. 1 is an exemplary block diagram of a data processing system in which aspects of the present invention may be implemented. The data processing system shown in FIG. 1 may be, for example, a system-on-a-chip. In one exemplary embodiment of the present invention, the data processing system in which the present invention is implemented is a CELL Broadband Engine (CBE) architecture based data processing system available from International Business Machines Corporation of Armonk, N.Y. The Cell Broadband Engine (CBE) architecture, implemented on a single chip, includes a plurality of heterogeneous processors, having different instruction sets that share a common memory and bus. For example, one heterogeneous processor may be a synergistic processing unit (SPU) having a vector instruction set and the other heterogeneous processor may be a PowerPC processor having a Reduced Instruction Set Computer (RISC) or other type of instruction set, both sharing the same memory space.

In such an embodiment, requesters, as discussed hereafter, may be the synergistic processing units (SPUs), the PowerPC processor, or other functional element within the CBE data processing system. Still further, the present invention may be implemented in any data processing system in which there are multiple requesters that may request access to one or more system resources.

As shown in FIG. 1, there may be multiple requester devices and multiple resources that each interact through a connection with a local bus 100. In the depicted example, four requesters are shown and are labeled R0 102, R1 103, R2 104, and input/output (I/O) controller 110. The requesters may be any type of unit that requests access to system resources. For example, the requesters may be I/O controllers, direct memory access (DMA) units, processors, and the like.

The managed resources may be any type of resource that is consumable by a process or a requester. For example, the managed resources may be a portion of bus bandwidth, memory bandwidth, processor cycles, an I/O device's bandwidth, or the like. The system may further include unmanaged resources UMR0 105 UMR1 106, such as a synchronous dynamic random access memory (SDRAM), for example. Unmanaged resources are typically resources that cannot be occupied by a single or small group of requesters or it is typically not shared by multiple requesters. Some units within the system may act as both requesters and resources. For example, an I/O controller 110 may act as a requester and a managed resource. Other units may act as only a requester or only a resource, e.g., requester R0 102 acts as a requester only.

Each requester is coupled to the local bus 100 through one or more communication channels. Requester R0 102 is coupled to the local bus 100 through a first communication channel 114 and a second communication channel 115. Similarly, requesters R1 103, R2 104 and I/O controller 110 are coupled to the local bus 100 through communication channels 118, 119, 120, 121, 126 and 127 as shown. The aforementioned communication channels may encompass wireless links, optical links, conductor cable lines, packet switched channels, direct communication channels, and any combination thereof.

Each unmanaged resource UMR0 105 and UMR1 106 is coupled to the local bus 100 through one or more communication channels. For example, unmanaged resource UMR0 105 is coupled to the local bus 100 through communication channels 124 and 125 and unmanaged resource UMR1 106 is coupled to the local bus 100 through communication channels 130 and 131. As with the requester communication channels, the communication channels coupling the unmanaged resources to the local bus may also encompass wireless links, optical links, conductor cable lines, packet switched channels, direct communication channels, and any combination thereof.

Typically, resources that relate to critical bottlenecks are managed and one or more resources of a computing system may be managed in accordance with the present invention. In the depicted example, managed resources may include, for example, memory controller 108, managed resource 109, I/O controller 110, and I/O devices 111. The managed resources may be coupled to the local bus 100 via a variety of different types of interfaces. For example, memory controller 108 is coupled to the local bus 100 via communication channels 116 and 117, managed resource 109 is coupled to local bus 100 via communication channels 122 and 123, I/O controller 110 is coupled to local bus 100 via communication channels 126 and 127, and I/O devices 111 are coupled to local bus 100 via communication channels 126-129. It should be noted that the I/O devices 111 are also under the control of the I/O controller 110.

Certain paths of usage between the requesters and the managed resources have special designations, i.e. managed paths (MP). Most paths that interconnect the requesters with the managed resources include a plurality of communication channels and the local bus 100. For example, the first communication channel 114, the local bus 100, and the communication channel 122 comprises a managed path (MP) between the requester R0 102 and the managed resource 109. The significance of the managed paths is that a token is used for controlling communication across the given managed path, as will be described in greater detail hereafter.

With the present invention, each requester is assigned a resource allocation ID (RAID), which is stored in a register and which is typically related to the requester's access characteristics. Requesters with the same RAID are referred to as a Resource Allocation Group (RAG). The token manager 112 allocates the tokens for each managed resource for a given RAG. The characteristics of the RAGs, which may be dynamic, are determined by software. Essentially, each RAG is allocated a predetermined percentage of bandwidth, the predetermined percentage being determined based on the desired system performance. In order for a requester within a RAG to communicate with or utilize a given managed resource through a managed path, a token must be granted by the token manager 112 to the requester. The token allows the requester to communicate with or utilize the managed resource via the managed path. Without a token, no communication or utilization of a managed resource is permitted across the managed path.

The token manager 112 does not arbitrarily assign tokens. To the contrary, the token manager 112 generates resource tokens for each RAG by virtue of a rate counter. Either rate counters or rate decrementers can be utilized to generate tokens. In either case a token is generated when the counter or decrementer reaches a certain value and the counter or decrementer is then again set to its starting value. A given requester cannot accumulate the tokens, however, and the sum of all rates for all of the RAGs must not exceed the capabilities of the resource.

In certain cases, such as with I/O devices, multiple managed paths are required for communication with the resource. For example, when an I/O device accesses memory, there is both an I/O controller and a memory controller required to complete the transfer. Hence, for such a transfer, there is a requirement of two tokens, one for each managed resource. Thus, in special cases where multiple tokens are required to perform a single task or communication, tokens must be accumulated to complete that single task or communication.

The requester can utilize the tokens and initiate the communication. A requester may first generate an internal token request for usage, which includes both an identifier of the requester's RAID and the managed resource that is to be utilized. The token request is then forwarded to the token manager 112. Upon reception of the request, the token manager 112 may grant the requested token. When all tokens for the managed path are granted, the requester is then allowed to perform the pending request.

It should be noted that there will be times when the given RAG will not have a requester with a pending request for the available managed resource. At such times, a token can be granted to a requester in another RAG or the token may go unused.

Figure 2:
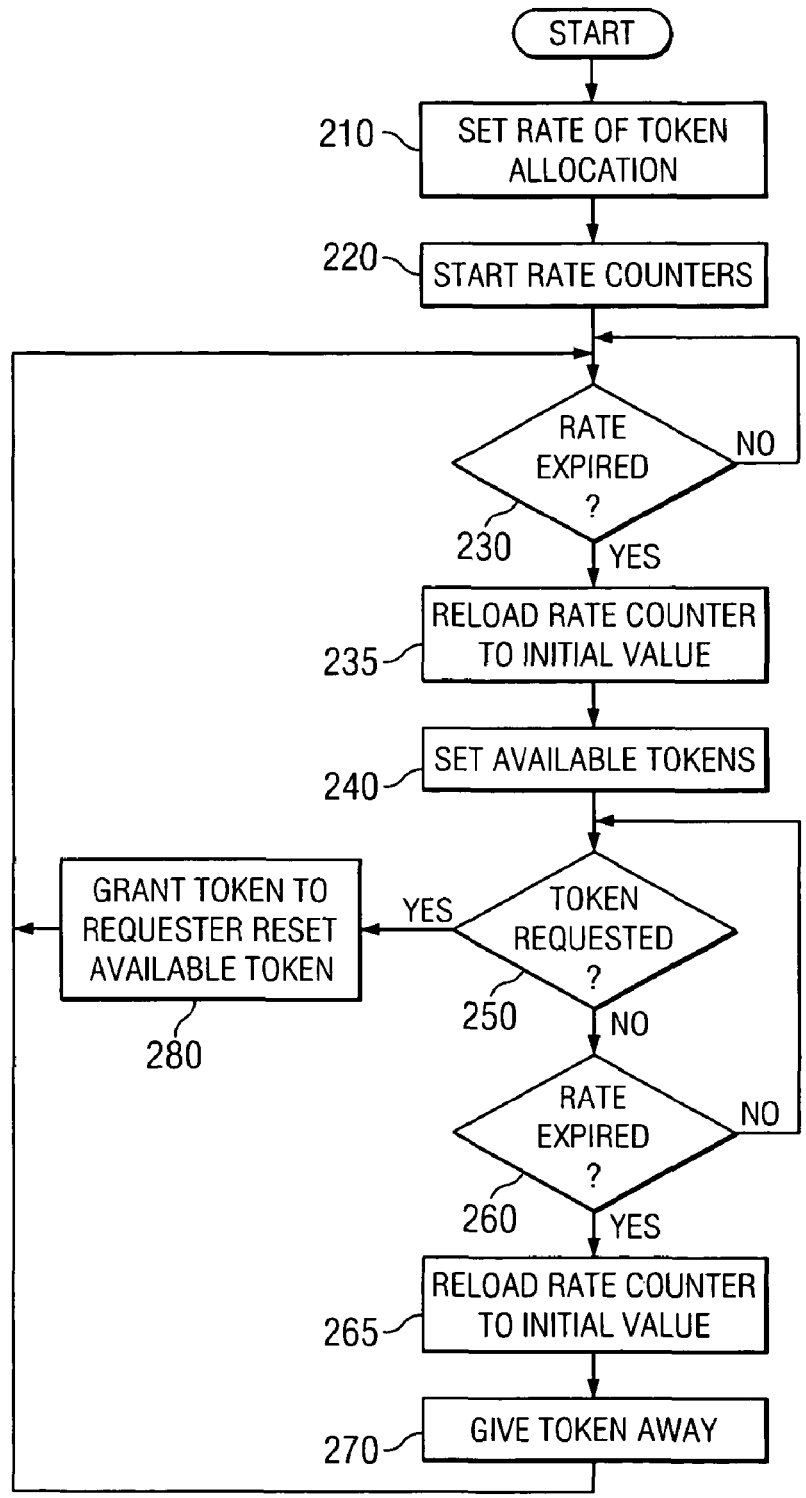
FIG. 2 is a flowchart outlining an exemplary token availability process in accordance with the architecture described in co-pending U.S. Patent Publication No. 2005/0138621 A1.

FIG. 2 is a flowchart outlining an exemplary token availability process in accordance with the architecture described in co-pending U.S. Patent Publication No. 2005/0138621 A1. It will be understood that each block, and combination of blocks, of the flowchart illustration in FIG. 2, and the flowchart illustrations in subsequent figures described hereafter, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

In order to cross-grant tokens, the token manager 112 may make a determination of availability of the token. As shown in FIG. 2, this determination of availability includes software setting the rate of token allocation (step 210) and the token manager 112 starting the corresponding rate counter (step 220). Once the rate counter is started, a determination is made as to whether the rate has expired (step 230). Upon expiration, the rate counter is reloaded to its initial value (step 235), which is configured by software, and the available tokens are set (step 240). Software "configures" the value for the rate counter by loading the value into an allocation register, for example.

A determination is then made as to whether there is a token request (step 250). If there is a token request, the token is granted, the associated token is reset and made available (step 280), and the token manager 112 again waits until the rate has expired (step 230). If there is no token request, the token manager 112 waits until the rate has expired (step 260). Once the rate counter has expired, the rate counter is reloaded to its initial value (step 265) and the token is given away (step 270). The operation then returns to step 230.

There are situations where there are unallocated tokens. In other words, there can be tokens that have no particular assignment to a RAG. These unallocated tokens can also be available to requesters with pending requests. However, to obtain the unallocated tokens, the procedure for availability is identical to the procedure illustrated in FIG. 2 above. A requester with a pending request must simply wait for a token, either a token created when the corresponding RAG's Rate Counter expires, an unused token from another RAG, or an unallocated token, to become available.

Figure 3:
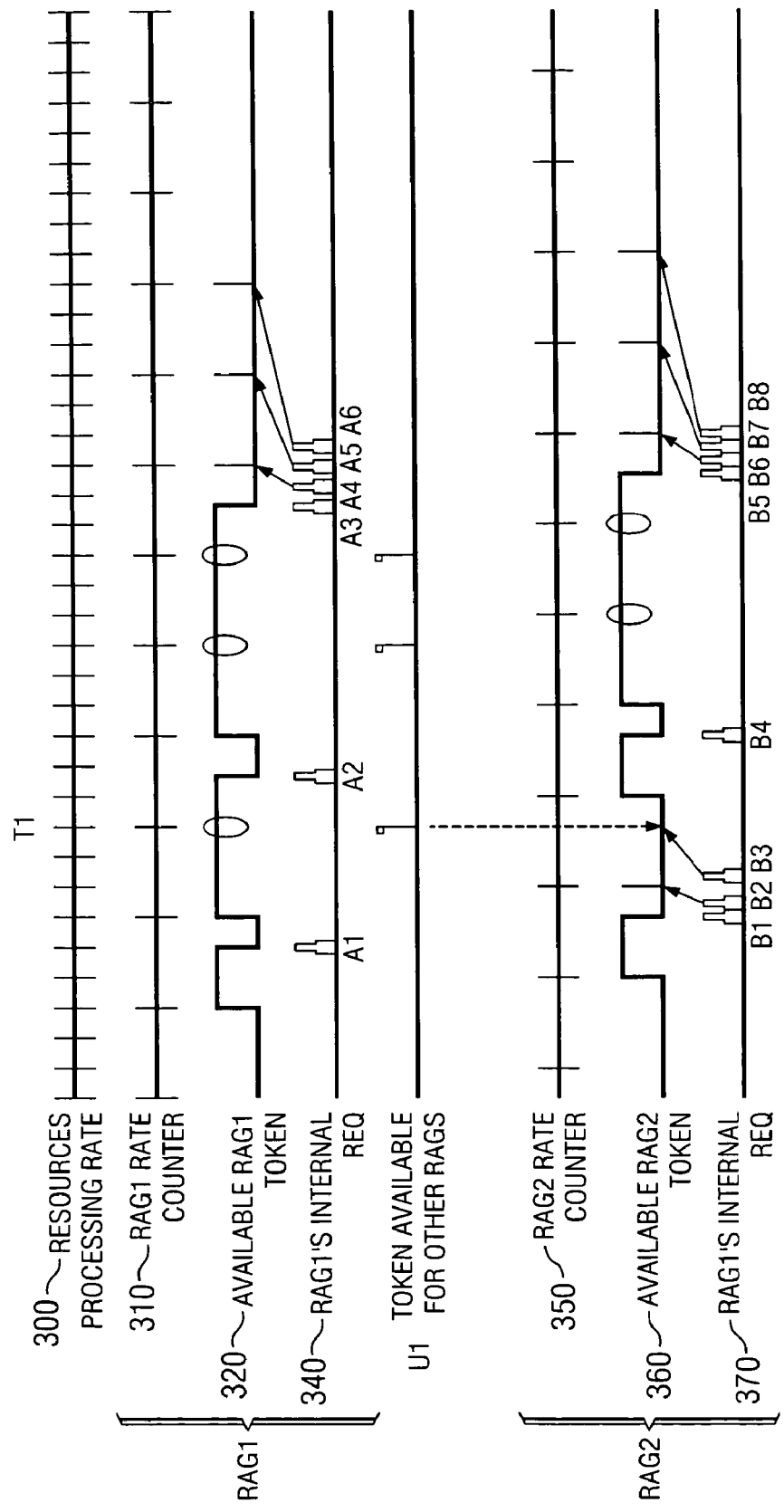
FIG. 3 is an exemplary diagram illustrating cross-granting of tokens in accordance with the architecture described in co-pending U.S. Patent Publication No. 2005/0138621 A1.

Referring now to FIG. 3, an illustration of cross-granting of tokens is provided. FIG. 3 is only exemplary and is not intended to state or imply any limitation with regard to the mechanisms of the present invention. It should be appreciated that there may be one or more RAGs utilized with a given process rate based on the desired performance capabilities of the system. Moreover, there are at least one or more tokens that each RAG utilizes.

As shown in FIG. 3, there is an overall rate at which resources are processed 300. For both RAG1 and RAG2, there are respective rate counters 310 and 350, respective token availabilities 320 and 360, and respective internal requests 340 and 370. The internal requests for RAG1 are labeled A1 to A6 and the internal requests for RAG2 are labeled B1 to B7. One should note that at time T1 a token is available for RAG1, but there is no pending request in RAG1. However, there is a pending request at T1 within RAG2. Hence, the token is cross-granted from RAG1 to RAG2.

Thus, from the above, it can be seen that the architecture described in co-pending U.S. Patent Publication No. 2005/0138621 A1 provides a mechanism for controlling resource allocation by providing tokens to requesters based on the resource requested and the resource allocation group of the requester. Furthermore, the architecture provides a mechanism for cross-granting tokens between resource allocation groups. While this mechanism works well, improvements are provided by the present invention to control priorities of resource allocation requests from requesters within the same resource allocation groups. This priority control helps to avoid bandwidth starvation of low request rate, latency-sensitive devices or units.

Figure 4:
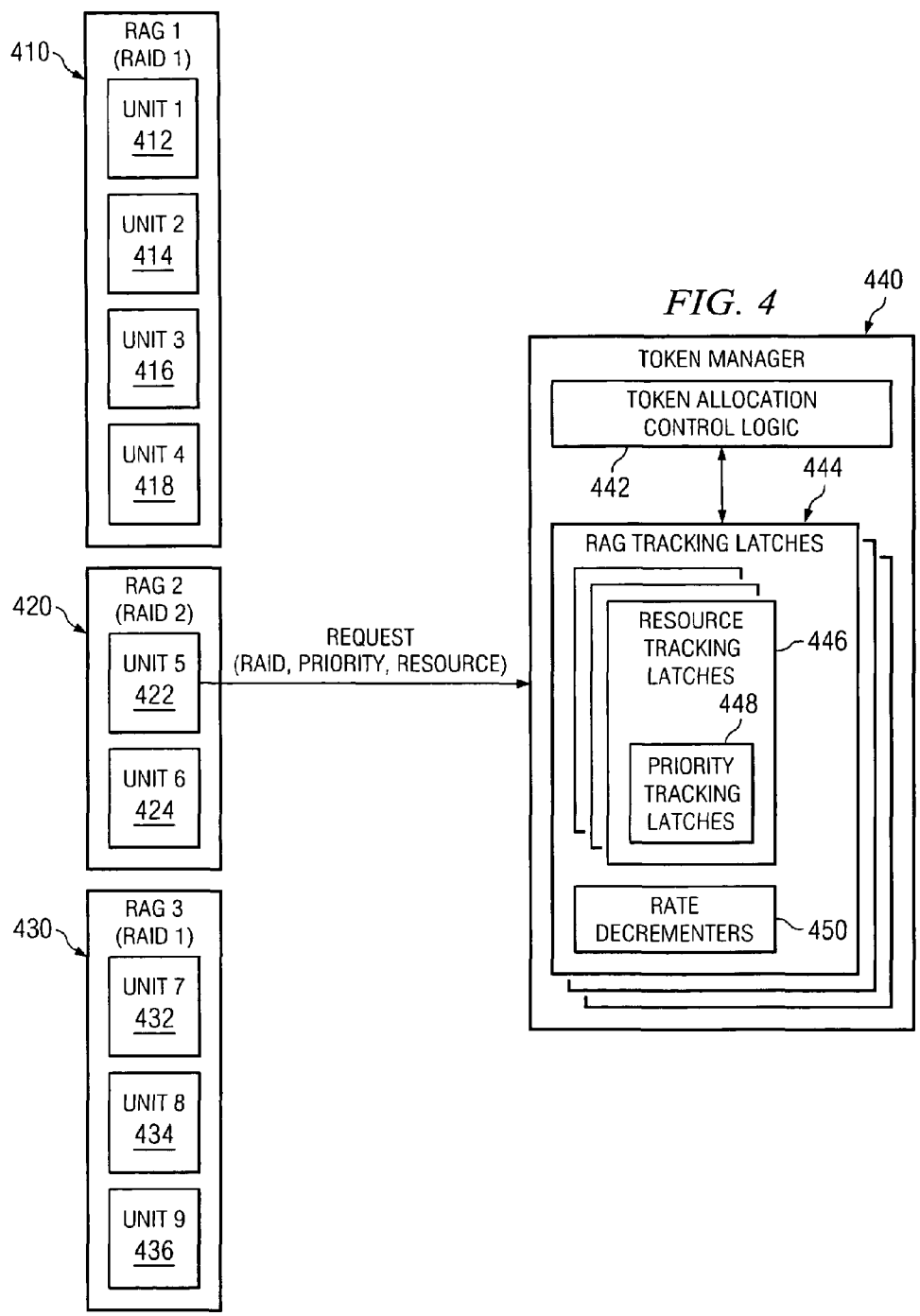
FIG. 4 is an exemplary diagram illustrating the primary operational components of one exemplary embodiment of the present invention.

FIG. 4 is an exemplary diagram illustrating the primary operational components of one exemplary embodiment of the present invention. As shown in FIG. 4, as with the architecture described in U.S. Patent Publication No. 2005/0138621 A1, requesters 412-418, 422-424, and 432-436 are organized into resource allocation groups (RAGs) 410, 420 and 430 based on their associated resource allocation IDs (RAIDs), e.g., RAID 1, RAID 2 and RAID 3. In this way, various units may be grouped together based on, for example, their operating characteristics as identified by their RAIDs.

The token manager 440 includes token allocation control logic 442 for controlling the allocation of tokens to the various requesters 412-418, 422-424, and 432-436 based on their respective RAGs, the resources for which access is requested, the rates at which tokens are generated and granted to the RAGs for each resource, and the priorities of the requests. The token allocation control logic 442 uses RAG tracking latches 444 to aid in determining how to allocate tokens to requesters 412-418, 422-424, and 432-436, as will be described hereafter.

The token manager 440 may include a plurality of latches that are grouped according to particular RAGs supported by the data processing system. Thus, for example, if three different RAGs are utilized in the data processing system, three different groups of latches 444 will be utilized in the token manager 440, one group of latches per RAG. Within a group of latches for a RAG, the latches are grouped according to the managed resources. Thus, within the RAG group of latches 444, one or more sub-groups of latches 446 are allocated to each managed resource. For example, if there are four managed resources in the data processing system, a particular RAG group of latches 444 will be grouped into four sub-groups 446, one for each of the four managed resources. Within each resource group of latches 446, the latches are organized into a first set of latches for high priority requests and a second set of latches for low priority requests, which are collectively referred to in FIG. 4 as priority tracking latches 448.

When a unit of a RAG wants to access a managed resource, the unit generates a request for the managed resource and the request is sent to the token manager. This request includes an identifier of the RAG in which the unit is grouped, e.g., the RAID may be used to identify the RAG. In addition, the request includes an identifier of the priority of the request and the resource that is targeted by the request. The priority of the request may be determined by the unit itself based on internal logic, by an external logic unit (not shown) that ranks requests based on the type of access requested, the source of the request, the cause of the request, any other criteria that may be used to rank requests as to high or low priority, or the like.

High priority can be assigned based on the type of requester and/or on the type of request that is being requested, for example. In one example, a processor performing critical control functions may always have high priority for tokens. In another example, high priority may be assigned to specific types of accesses that are for software locks, for example, in order to minimize the amount of time that a critical lock is held. Moreover, accesses to a page table in memory, when these accesses occur as part of the hardware translation lookaside buffer (TLB) miss handling, may also be assigned high priority in accordance with the present invention.

In some cases a single physical requesting unit may perform accesses on behalf of multiple RAGs, as in the case of an I/O interface controller making requests for multiple I/O busses or I/O devices. In this case, token requests may have different Resource Access Identifier (RAID) values and a different priority. Therefore, to the token manager 440, the physical requester, e.g., unit 422, may appear to be multiple virtual requesters.

The token manager 440 tracks all the requests for each resource including the associated RAG and the priority of the requests. In one exemplary embodiment of the present invention, the token manager keeps track of up to 17 virtual requesters and requests for up to 20 resource targets per requester. Internally, the token manager 440 keeps track of requests on a per RAG basis using the tracking latches 444 and the respective groups 446 and 448 of these tracking latches 444.

For each RAG, the token manager 440 records high priority requests for each resource in a first set of priority grouped latches and low priority requests for each resource in a second set of priority grouped latches, collectively referred to as priority tracking latches 448. The token manager 440 uses these tracking latches 444-448 and rate decrementers 450 to determine how often and exactly when to generate and grant tokens to particular requesters, e.g., units 412-418, 422-424, and 432-436. The token manager 440 may have round-robin pointers per priority, per resource and per RAG to track which of the multiple requesters in a RAG should be granted a token on a round-robin basis when a token becomes available and there are multiple outstanding requests.

In an exemplary embodiment of the present invention, the token allocation control logic 442 establishes a rate decrementer for each combination of resource and RAG. Thus, if there are three RAGs and four managed resources in the data processing system, twelve rate decrementers 450 will be established for managing the allocation of tokens for accessing resources to the RAGS 410, 420 and 430. When the rate decrementer 450 reaches a zero count, a token for the corresponding resource is generated and granted to the corresponding RAG so that a requester associated with that RAG may access the corresponding resource.

When a token is generated and granted to a particular RAG, the token allocation control logic 442 uses the RAG tracking latches 444 to determine which unit within the RAG will obtain the token for accessing the resource. In particular, the token allocation control logic 442 identifies the group of latches corresponding to the RAG to which the token is granted, e.g., RAG tracking latches 444. The token allocation control logic 442 then identifies the group of RAG tracking latches 444 corresponding to the resource associated with the granted token, e.g., resource tracking latches 446. The token allocation control logic 442 then looks at the high priority and low priority requests pending for the particular resource from the particular RAG and determines which request should receive the granted token. The corresponding requester, e.g., unit 422, is then granted the token and may access the requested resource.

Figure 5:
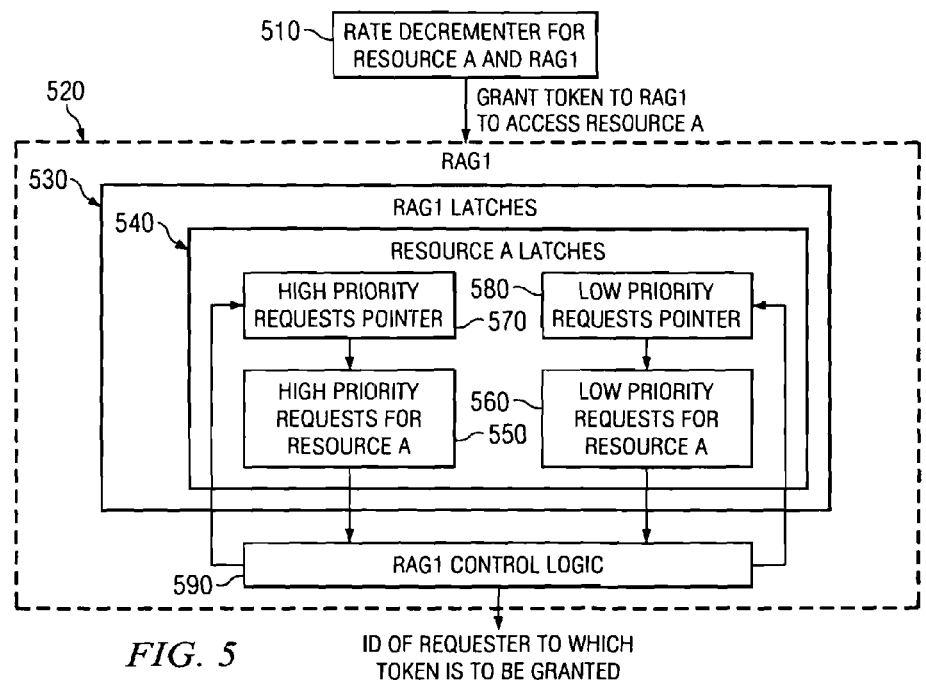
FIG. 5 is an exemplary diagram illustrating a process of looking at high priority and low priority requests to determine which request should receive a granted token in accordance with one exemplary embodiment of the present invention.

This process of looking at high priority and low priority requests to determine which request should receive the granted token is illustrated in FIG. 5. The mechanisms shown in FIG. 5 are for a single resource and single RAG. As shown in FIG. 5, when the rate decrementer 510 associated with the resource and RAG decrements to zero, a token for accessing the resource by the RAG is generated and granted to the RAG, e.g., RAG1 520.

The token manager control logic (not shown) communicates with the RAG1 control logic 590 to cause the RAG1 control logic 590 to retrieve values from high priority request and low priority request latches 550 and 560 in resource latches 540 corresponding to resource associated with the token, e.g., resource A. In one exemplary embodiment, pointers 570 and 580 are utilized to identify the next request in the high priority requests 550 and low priority requests 560 which are to receive a token for accessing the associated resource. In an exemplary embodiment, the pointers 570 and 580 are round-robin pointers that are incremented when a token is granted to a requester corresponding to a request pointed to by the round-robin pointers. Round-robin pointers are utilized to give fair treatment between multiple high priority requesters and to give fair treatment between multiple low priority requesters. There are several methods for implementing such a round-robin pointer.

In one scheme, in every cycle, the high priority request round-robin pointer is advanced one "slot," or latch, until a "slot" or latch having an active request is encountered. Thus, there are times when the high priority round-robin pointer will point to a tracking latch associated with a requester that does not have an active high priority request. At other times, the high priority request round-robin pointer will be advanced to a next "slot" or latch where a high priority request is pending. Likewise, the low priority request round-robin pointer is advanced one "slot" or latch per cycle until it points to an outstanding low priority request in the RAG. When the round-robin pointers point to a "slot" or latch in which there is a pending request, the round-robin pointer is not advanced until the request is dispatched, i.e. granted a token for accessing the resource.

In another scheme, where the number of total potential requests is small, it is feasible to advance a round-robin pointer in a single cycle to directly point to the next outstanding request. In this alternative scheme, if any of the tracking latches for the high priority requests has a pending request, the high priority request will be selected over any low priority requests pending in the low priority tracking latches.

A high priority request is only eligible to be granted a token if the high priority request round-robin pointer points to the request. A low priority request is only eligible to be granted a token if the low priority request round-robin pointer points to the request.

However, a high priority request is always selected over a low priority request. Thus, based on whether the high priority requests pointer 570 and the low priority requests pointer 580 point to pending requests, the token granted to RAG1 520 is allocated to a particular requester corresponding to a selected request pointed to by the pointers 570 and 580. If pointer 570 points to a pending high priority request, that request will always be selected for allocation of the token to the associated requester, even if pointer 580 points to a pending low priority request. Only if the pointer 570 does not point to a pending high priority request will the token be allocated to a requester associated with a low priority request pointed to by pointer 580.

Figure 6:
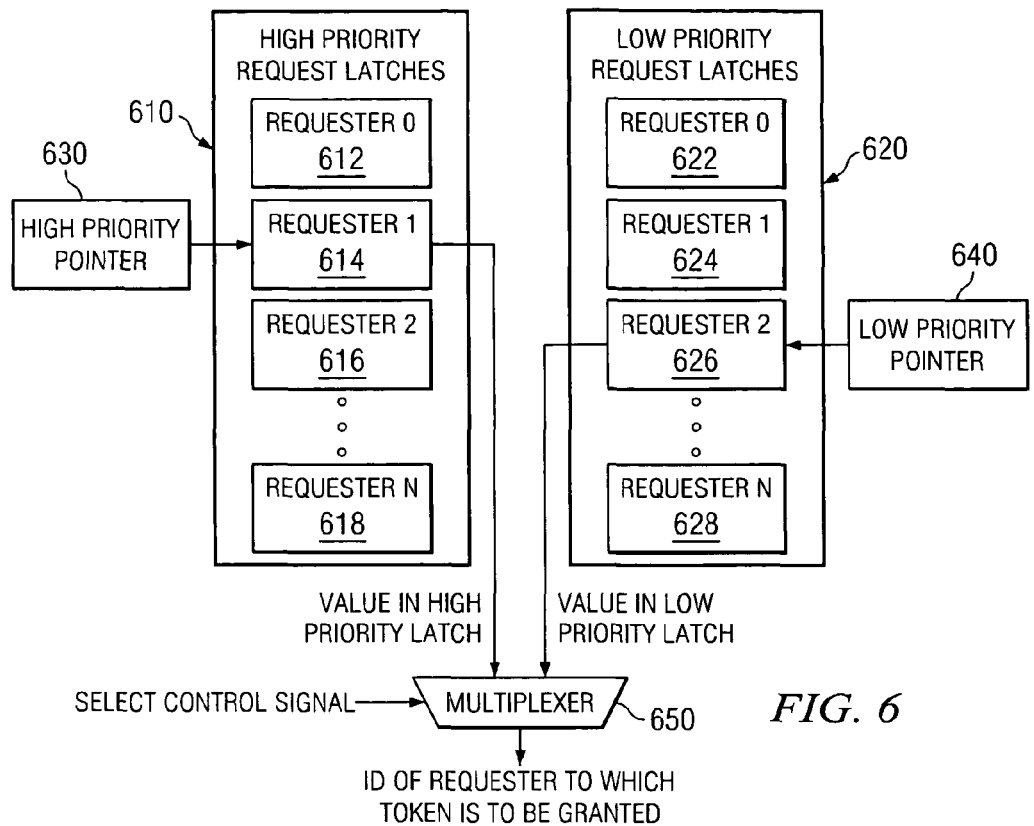
FIG. 6 is an exemplary diagram illustrating a mechanism for selecting between high and low priority requests in accordance with one exemplary embodiment of the present invention.

The mechanism for selecting between high and low priority requests is further illustrated in the exemplary diagram of FIG. 6. As shown in FIG. 6, each requester in the data processing system has its own associated latch 612-618 in the high priority latches 610 and its own associated latch 622-628 in the low priority latches 620. When a request is sent from a requester to the token manager, the associated latch 612-618 or 622-628 is set, e.g., its value is changed from "0" to "1," based on the RAID, the resource requested, and the priority of the request.

Pointers 630 and 640 are provided for pointing to the latches 612-618 and 622-628 to thereby identify the next latch whose associated requester should receive the token for accessing the associated resource. The value stored in the latch pointed to by pointers 630 and 640 is output to the multiplexer 650. The multiplexer 650 receives these values as inputs and also receives a select control signal. The select control signal is such that if the value received from a high priority latch, pointed to by the high priority pointer 630, is a set value, e.g., a logical "1", then the requester associated with that high priority latch is granted the token. If the value of the high priority latch pointed to by the high priority pointer 630 is not set, and the value of the low priority latch pointed to by the low priority pointer 640 is set, then the token is provided to the requester associated with the low priority latch.

After granting the token to either the requester associated with the high priority request or the requester associated with the low priority request, the pointers 630 and 640 are updated. This updating may involve incrementing the pointer associated with the latches to which the token was granted. Thus, if the requester associated with the high priority latch was selected as the one to which the token was to be granted, the corresponding high priority latch may be reinitialized to an unset value and the pointer incremented to a next latch in the high priority request latches 610. Similarly, the low priority pointer 640 may be incremented if a requester associated with a low priority latch was selected to receive the token.

The incrementing of the pointers 630 and 640 may take many different forms and may be controlled by control logic provided in the token manager. In exemplary embodiments of the present invention, the incrementing is done in a round-robin fashion, although the round-robin fashion may itself take different forms.

In one exemplary embodiment, the pointers are incremented one latch per cycle until a latch corresponding to a pending request is encountered. Thus, it is possible, after incrementing, that the pointers 630 and 640 may point to a latch that has an unset value. In this way, low priority requests may be selected for dispatch even though there may be a high priority request pending. In this way, low priority requests will not starve for available resources.

In another exemplary embodiment, the pointers 630 and 640 are incremented so that they immediately point to the next pending request identified in the latches. In this case, if there are any high priority requests pending, as identified by the high priority latches 610, those requests will be selected before any of the low priority requests are selected for dispatch. Only when there are no pending high priority requests in the latches 610 will the requester associated with one of the low priority requests, corresponding to a latch pointed to by pointer 640, be selected for receiving the token. In such a case, while there may be a chance of starvation of low priority requests, the more critical operations associated with high priority requests will be ensured access to the resources before low priority requests.

In the embodiments described above, because only a few RAGs are present in the exemplary data processing system, there is an implicit and physical association between tracking latches and requesters, i.e. there is a 1-to-1 correspondence in which there is a specific tracking latch for each requester. For example, if a requester 0, in RAG0, makes a low priority request for resource A, a specific physical tracking latch is set.

This tracking latch is always associated with RAG0, requester 0, and resource A. Thus, if there are four RAGs and even if a requester can only be in one RAG, the physical implementation has 4 sets of latches, one for each potential RAG for this requester. In embodiments of the present invention in which there are many RAGs provided in the data processing system, it would be more efficient, i.e. it would require fewer tracking latches, to use only one set of tracking latches for each requester and resource. A register may be used to identify the RAG for these request latches.

It should be kept in mind that the above mechanisms of the present invention work within the original allocation of resources to the resource allocation groups (RAGs). This resource allocation is primarily controlled by way of the RAG decrementers. Thus, each RAG will still be given only its associated percentage of the resource, but individual units within the RAG will receive varying portions of this allocated percentage of the resource as determined based on the priority mechanisms of the present invention. As a result, one RAG cannot dominate a resource over other RAGs contrary to the original allocation of resources to achieve a desired operation of the data processing system.

It should be appreciated that while the above embodiments are described in terms of latches, multiplexers, and other hardware elements, the present invention is not limited to hardware embodiments. To the contrary, the mechanisms of the present invention may also be implemented in software or a combination of hardware and software. For example, rather than utilizing latches and multiplexers, the present invention may be performed using various data structures for tracking high and low priority requests from RAGs for particular resources.

FIG. 7 is a flowchart outlining an exemplary operation of the present invention when selecting a requester to which a token is to be granted in response to a token being granted to resource allocation group in accordance with the present invention. The operation outlined in FIG. 7 may operate in concert with the operation described above in FIG. 2. For example, the operation outlined in FIG. 7 may be performed as part of step 280 in FIG. 2.

As shown in FIG. 7, the operation starts by generating and granting of a token for accessing a resource by a particular resource allocation group (step 710). This may be done, for example, in response to a decrementer associated with the resource and RAG being decremented to zero thereby causing the generation of the token for that resource and RAG.

The group of latches for the particular RAG are then identified (step 720) and the particular sub-group of latches for the resource are identified (step 730). The values of the latches pointed to by the high priority pointer and low priority pointers in the sub-group of latches for the resource are then read (step 740). A determination is made as to whether the value associated with the high priority pointer indicates a pending request (step 750). If so, then the token is granted to the requester associated with the request corresponding to the latch pointed to by the high priority pointer (step 760). If the value associated with the high priority pointer indicates a request is not pending, then a determination is made as to whether the value corresponding to the low priority pointer indicates a request is pending (step 770).

If the value corresponding to the low priority pointer indicates a pending request, then the token is granted to the requester associated with the request corresponding to the latch pointed to by the low priority pointer (step 780). Otherwise, the token goes unused (step 790).

Thereafter, the value of the latch corresponding to the selected requester to receive the token is reset to a value corresponding to no pending request (step 800). The pointers are then incremented in accordance with a pointer incrementing scheme being implemented (step 810). The operation then terminates.

Thus, the present invention provides a mechanism for priority control in resource allocation. The mechanism of the present invention makes resource allocation fair between low and high priority requests by allocation a percentage of a resource to a resource allocation groups and then controlling access to this percentage of a resource by units within the resource allocation group based on priority of requests and a fairness scheme. The mechanism of the present invention performs such operations while minimizing costs in implementing the present invention. That is, costs are minimized by keeping the logic and hardware elements for implementing the present invention to a minimum. For example, only a small number of latches are required to record requests as high or low priority requests, a single multiplexer per RAG and resource combination is required to select between high and low priority requests, and number of bits for round-robin pointers is kept small. For a reasonable number of resource access groups, the mechanisms of the present invention provide a low-cost solution to give low latency to high priority requests and still limit the overall amount of resources assigned to a resource allocation group.

It should be noted that while the above embodiments are described in terms of high priority requests and low priority requests, the present invention is not limited to such. Rather, the exemplary embodiments are described using only two priorities in order to make the description of the present invention as easy to understand as possible. In actual implementations of the present invention, two or more priorities may be used with a corresponding number of tracking latches provided to track requests having priorities in the two or more priorities supported by the particular implementation. Any number of priorities greater than two may be used without departing from the spirit and scope of the present invention.

Figure 8:
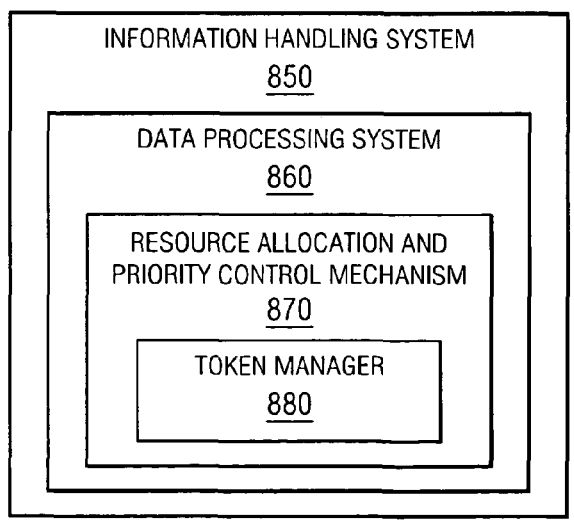
FIG. 8 is an exemplary block diagram of an information handling system in which the exemplary data processing system of the present invention may be implemented.

As shown in FIG. 8, the mechanisms of the present invention may be implemented in an information handling system (IHS) 850. The IHS 850 may employ a data processing system 860, such as the data processing system depicted in FIG. 1, incorporating the resource allocation and priority control mechanism 870, including token manager 880, of the present invention. The IHS 850 may take many forms. For example, the IHS 850 may take the form of a desktop, server, portable, laptop, notebook, or other form factor computer or data processing system. IHS 850 may also take other form factors such as a personal digital assistant (PDA), a gaming device or console, a portable telephone device, a communication device or other devices that include a microprocessor or a system-on-a-chip.

As stated previously, it is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for controlling access to a resource, comprising:
   generating and granting a token to a resource allocation group, wherein the resource allocation group comprises one or more requester devices within the data processing system, and wherein the resource allocation group is one of a plurality of resource allocation groups in the data processing system;
   obtaining request information from a group of request storage devices, separate from the one or more requester devices and allocated, from a plurality of storage devices, to the resource allocation group and the resource, wherein the group of request storage devices is separated into a first sub-group of high priority request storage devices and a second sub-group of low priority request storage devices;
   selecting a requester device from the one or more requester devices to receive the token based on the request information obtained from the group of request storage devices; and
   granting the token to the selected requester device, wherein the selected requester device uses the token to access the resource.

2. The method of claim 1, wherein the token is generated and granted to the resource allocation group in response to a counter associated with the resource allocation group reaching a predetermined value.

3. The method of claim 1, wherein the resource allocation group is allocated a portion. less than a full amount, of the resource to be shared by the one or more requester devices.

4. The method of claim 1, wherein obtaining request information from a group of request storage devices associated with the resource allocation group and the resource comprises:
   obtaining a value of a first pointer associated with the first sub-group of high priority request storage devices;
   obtaining a value of a second pointer associated with a second sub-group of low priority request storage devices;
   determining if there is a pending high priority request for access to the resource based on the value of the first pointer; and
   determining if there is a pending low priority request for access to the resource based on the value of the second pointer.

5. The method of claim 4, wherein selecting a requester device from the one or more requester devices to receive the token based on the request information obtained from the group of request storage devices, comprises:
   selecting a requester device associated with the high priority request if a pending high priority request is identified by the value of the first pointer; and
   selecting a requester device associated with the low priority request if a pending low priority request is identified by the value of the second pointer and the value of the first pointer indicates that a high priority request is not pending.

6. The method of claim 4, wherein the first sub-group of high priority request storage devices may contain a pending high priority request yet the first pointer may indicate that a high priority request is not pending if the first pointer points to an empty high priority request storage device.

7. The method of claim 4, further comprising:
incrementing the value of the first pointer to point to a next high priority request storage device in the first sub-group of high priority request storage devices only if a request associated with a current value of the first pointer is dispatched; and
incrementing the value of the second pointer to point to a next low priority request storage device in the second sub-group of low priority request storage devices only if a request associated with a current value of the second pointer is dispatched.

8. The method of claim 4, further comprising:
incrementing the value of the first pointer to point to a next non-empty high priority request storage device in the first sub-group of high priority request storage devices only if a request associated with a current value of the first pointer is dispatched; and
incrementing the value of the second pointer to point to a next non-empty low priority request storage device in the second sub-group of low priority request storage devices only if a request associated with a current value of the second pointer is dispatched.

9. The method of claim 1, wherein the data processing system supports a plurality of resource allocation groups and a plurality of managed resources, wherein each resource allocation group has a set of request storage devices, and wherein the set of request storage devices for each resource allocation group is organized into a group of request storage devices for each managed resource, and wherein each group of request storage devices for each managed resource is organized into a first sub-set of request storage devices associated with high priority requests and a second sub-set of request storage devices associated with low priority requests.

10. The method of claim 9, wherein each combination of resource allocation group and managed resource has an associated counter for determining when to allocate a token for accessing the managed resource to the particular resource allocation group.

11. The method of claim 1, wherein the resource allocation group comprises one or more requester devices within the data processing system that have a same resource allocation identifier.

12. A computer program product comprising a computer readable storage medium having a computer readable program stored thereon, wherein the computer readable program, when executed on a computing device, causes the computing device to:
generate and grant a token to a resource allocation group, wherein the resource allocation group comprises one or more requester devices within the data processing system, and wherein the resource allocation group is one of a plurality of resource allocation groups in the data processing system;
obtain request information from a group of request storage devices, separate from the one or more requester devices and allocated, from a plurality of storage devices, to the resource allocation group and the resource, wherein the group of request storage devices is separated into a first sub-group of high priority request storage devices and a second sub-group of low priority request storage devices;
select a requester device from the one or more requester devices to receive the token based on the request information obtained from the group of request storage devices; and
grant the token to the selected requester device, wherein the selected requester device uses the token to access a resource.

13. The computer program product of claim 12, wherein the token is generated and granted to the resource allocation group in response to a counter associated with the resource allocation group reaching a predetermined value.

14. The computer program product of claim 12, wherein the resource allocation group is allocated a portion, less than a full amount, of the resource to be shared by the one or more requester devices.

15. The computer program product of claim 12, wherein the computer readable program causes the computing device to obtain request information from a group of request storage devices associated with the resource allocation group and the resource by:
obtaining a value of a first pointer associated with the first sub-group of high priority request storage devices;
obtaining a value of a second pointer associated with a second sub-group of low priority request storage devices;
determining if there is a pending high priority request for access to the resource based on the value of the first pointer; and
determining if there is a pending low priority request for access to the resource based on the value of the second pointer.

16. The computer program product of claim 15, wherein the computer readable program causes the computing device to select a requester device from the one or more requester devices to receive the token based on the request information obtained from the group of request storage devices, by:
selecting a requester device associated with the high priority request if a pending high priority request is identified by the value of the first pointer; and
selecting a requester device associated with the low priority request if a pending low priority request is identified by the value of the second pointer and the value of the first pointer indicates that a high priority request is not pending.

17. The computer program product of claim 15, wherein the first sub-group of high priority request storage devices may contain a pending high priority request yet the first pointer may indicate that a high priority request is not pending if the first pointer points to an empty high priority request storage device.

18. The computer program product of claim 15, wherein the computer readable program further causes the computing device to:
increment the value of the first pointer to point to a next high priority request storage device in the first sub-group of high priority request storage devices only if a request associated with a current value of the first pointer is dispatched; and
increment the value of the second pointer to point to a next low priority request storage device in the second sub-group of low priority request storage devices only if a request associated with a current value of the second pointer is dispatched.

19. The computer program product of claim 15, wherein the computer readable program further causes the computing device to:

increment the value of the first pointer to point to a next non-empty high priority request storage device in the first sub-group of high priority request storage devices only if a request associated with a current value of the first pointer is dispatched; and increment the value of the second pointer to point to a next non-empty low priority request storage device in the second sub-group of low priority request storage devices only if a request associated with a current value of the second pointer is dispatched.

20. The computer program product of claim 12, wherein the data processing system supports a plurality of resource allocation groups and a plurality of managed resources, wherein each resource allocation group has a set of request storage devices, and wherein the set of request storage devices for each resource allocation group is organized into a group of request storage devices for each managed resource, and wherein each group of request storage devices for each managed resource is organized into a first sub-set of request storage devices associated with high priority requests and a second sub-set of request storage devices associated with low priority requests.

21. The computer program product of claim 20, wherein each combination of resource allocation group and managed resource has an associated counter for determining when to allocate a token for accessing the managed resource to the particular resource allocation group.

22. The computer program product of claim 12, wherein the resource allocation group comprises one or more requester devices within the data processing system that have a same resource allocation identifier.

23. An apparatus, comprising:

a processor;

a plurality of requester devices coupled to the processor;

a resource coupled to the plurality of operational units;

a memory coupled to the processor; and a plurality of request storage devices coupled to the processor, wherein the memory stores instructions which, when executed by the processor, cause the processor to:

generate and grant a token to a resource allocation group, wherein the resource allocation group comprises one or more requester devices, from the plurality of requester devices, and wherein the resource allocation group is one of a plurality of resource allocation groups;

obtain request information from a group of request storage devices separate from the one or more requester devices and allocated, from the plurality of request storage devices, to the resource allocation group and the resource, wherein the group of request storage devices is separated into a first sub-group of high priority request storage devices and a second sub-group of low priority request storage devices;

select a requester device from the one or more requester devices to receive the token based on the request information obtained from the group of request storage devices; and grant the token to the selected requester device, wherein the selected requester device uses the token to access the resource.

* * * * *